*(12)* United States Patent
Oh et al.

(10) Patent No.: US 7,466,872 B2
(45) Date of Patent: Dec. 16, 2008

(54) OBJECT BASED BOUNDARY REFINEMENT METHOD

(75) Inventors: Seho Oh, Bellevue, WA (US);
Shih-Jong J. Lee, Bellevue, WA (US)

(73) Assignee: DRVision Technologies LLC, Bellevue, WA (US)

( * ) Notice: Subject to any disclaimer, the term of this patent is extended or adjusted under 35 U.S.C. 154(b) by 407 days.

(21) Appl. No.: 11/165,561

(22) Filed: Jun. 20, 2005

(65) Prior Publication Data

US 2006/0285743 A1 Dec. 21, 2006

(51) Int. Cl.
*G06K 9/40* (2006.01)
*G06K 9/42* (2006.01)
*G06K 9/44* (2006.01)

(52) U.S. Cl. ............... 382/266; 382/256; 382/257
(58) Field of Classification Search ........... 382/173, 382/204, 236, 256, 257, 266
See application file for complete search history.

(56) References Cited

U.S. PATENT DOCUMENTS

| | | | |
|---|---|---|---|
| 5,684,940 A * | 11/1997 | Freeman et al. ............. 345/630 |
| 5,867,610 A | 2/1999 | Lee |
| 6,088,473 A * | 7/2000 | Xu et al. .................... 382/132 |
| 6,381,350 B1 * | 4/2002 | Klingensmith et al. ...... 382/128 |
| 6,463,175 B1 | 10/2002 | Lee |
| 6,647,147 B1 * | 11/2003 | Miyano ...................... 382/199 |
| 6,785,409 B1 * | 8/2004 | Suri .......................... 382/128 |
| 7,133,572 B2 * | 11/2006 | Neubauer et al. ............ 382/282 |
| 2002/0159096 A1 * | 10/2002 | Sun et al. ................... 358/3.26 |
| 2004/0037465 A1 * | 2/2004 | Krause ....................... 382/199 |
| 2004/0128656 A1 * | 7/2004 | Yamagata ................... 717/136 |
| 2004/0202368 A1 | 10/2004 | Lee |
| 2005/0027188 A1 * | 2/2005 | Metaxas et al. ............. 600/410 |

OTHER PUBLICATIONS

Spreeuwers, Luke, and Marcel Breeuwer. "Automatic Detection of Myocardial Boundaries in MR Cardio Perfusion Images." Medical Image Computing and Computer-Assisted Intervention—MICCAI 2001: 4th International Conference Utrecht, The Netherlands, Oct. 14-17, 2001, Proceedings 2208(2001): 1228-1231.*

(Continued)

*Primary Examiner*—Matthew C Bella
*Assistant Examiner*—Michael A Newman

(57) ABSTRACT

An object based boundary refinement method for object segmentation in digital images receives an image and a single initial object region of interest and performs refinement zone definition using the initial object regions of interest to generate refinement zones output. A directional edge enhancement is performed using the input image and the refinement zones to generate directional enhanced region of interest output. A radial detection is performed using the input image the refinement zones and the directional enhanced region of interest to generate radial detection mask output. In addition, a final shaping is performed using the radial detection mask having single object region output.

A directional edge enhancement method determining pixel specific edge contrast enhancement direction according to the object structure direction near the pixel consists receives an image and refinement zones and performs 1D horizontal distance transform and 1D vertical distance transform using the refinement zones to generate horizontal distance map and vertical distance map outputs. A neighboring direction determination is performed using the horizontal distance map and the vertical distance map to generate neighboring image output. In addition, a directional edge contrast calculation using the neighboring image and input image having directional enhanced region of interest output.

7 Claims, 9 Drawing Sheets

OTHER PUBLICATIONS

Felzenszwalb, Pedro F. and Daniel P. Huttenlocher. "Distance Transforms of Sampled Functions." Technical report, Cornell Computing and Information Science, TR2004-1963, Sep. 2004: 1-15 <http://citeseer.ist.psu.edu/696385.html>.*

U.S. Appl. No. 10/767,530, filed Jan. 2004, Lee; Phan.

U.S. Appl. No. 10/998,282, filed Nov. 2004, Lee; Phan.

Xiao-Ping Zhang and Mita D. Desai, Wavelet Based Automatic Thresholding for Image Segmentation, In Proc. of ICIP'97, Santa Barbara, CA, Oct. 26-29, 1997.

S Wu and Amin, Automatic Thresholding of Gray-level Using Multistage Approach, proceed. of the 7th International Conference onDocument Analysis and Recognition (ICDAR) 2003.

Wilkinson, Gijs de Vries, Westenberg, Blood Vessel Segmentation Using Moving-Windowrobust Automatic Threshold Selection, IEEE Intern. Conf. on Image Processing Sep. 2003.

Yitzhaky and Peli, A Method for Objective Edge Detection Evaluation and Detector Parameter Selection, IEEE Trans. on Pami vol. 25, No. 8, pp. 1027-1033, Aug. 2003.

Luck, Bovik, Richards-Kortum, Segmenting Cervical Epithelial Nuclei From Confocal Images Using Gaussian Markov Random Fields, IEEE Intern. Conf. on Image Processing Sep. 2003.

Leung, Chen, Kwok, and Chan, Brain Tumor Boundary Detection in MR Image with Generalized Fuzzy Operator, IEEE Intern. Conf. on Image Processing Sep. 2003.

Pascal Bamford, Empirical Comparison of Cell Segmentation Algorithms Using an Annotated Dataset, IEEE Intern. Conf. on Image Processing Sep. 2003.

* cited by examiner

| 1D Horizontal input | 0 | 0 | 1 | 1 | 1 | 1 | 0 | 0 | 0 | 1 | 1 | 1 | 1 | 1 | 0 |
|---|---|---|---|---|---|---|---|---|---|---|---|---|---|---|---|
| Horizontal distance | 0 | 0 | 1 | 2 | 3 | 2 | 1 | 0 | 0 | 0 | 1 | 2 | 2 | 1 | 0 |

Figure 6

OBJECT BASED BOUNDARY REFINEMENT METHOD

TECHNICAL FIELD

This invention relates to the enhanced segmentation of digital images containing objects of interest to determine the regions in the images corresponding to those objects of interest.

BACKGROUND OF THE INVENTION

Image object segmentation processes digital images containing objects of interest and determines the regions in the images corresponding to those objects of interest. Image object segmentation is critical for many applications such as the detection of the coronary border in angiograms, multiple sclerosis lesion quantification, surgery simulations, surgical planning, measuring tumor volume and its response to therapy, functional mapping, automated classification of blood cells, studying brain development, detection of microcalcifications on mammograms, image registration, atlas-matching, heart image extraction from cardiac cineangiograms, detection of tumors, cell high content screening, automatic cancer cell detection, semiconductor wafer inspection, circuit board inspection and alignment etc. Image object segmentation is the basis to follow on object based processing such as measurement, analysis and classification. Therefore, good object segmentation is highly important. If segmented object regions are incorrect. The measurements performed on the segmented objects will certainly be incorrect and therefore any analysis and conclusion drawn based on the incorrect measurements will be erroneous and compromised.

It is difficult to specify what constitutes an object of interest in an image and define the specific segmentation procedures. General segmentation procedures tend to obey the following rules:

Regions of object segmentation should be uniform and homogeneous with respect to some characteristics, such as gray level or texture.

Region interiors should be simple and without many small holes.

Adjacent regions of different objects should have significantly different values with respect to the characteristic on which they are uniform.

Boundaries of each segment should be simple, not ragged, and must be spatially accurate and no overlap.

However, enforcing the above rules is difficult because strictly uniform and homogeneous regions are typically full of small holes and have ragged boundaries. Insisting that adjacent regions have large differences in values could cause regions to merge and boundaries to be lost. Therefore, it is not possible to create a universal object segmentation method that will work on all types of objects in real life situations.

Prior art segmentation methods are performed in a primitive and ad-hoc fashion on almost all image processing systems. For simple applications, image thresholding is the standard method for object segmentation. This works on images containing bright objects against dark background or dark objects against bright background such as man made parts in machine vision applications. In this case, the object segmentation methods amount to determining a suitable threshold value to separate objects from background (Xiao-Ping Zhang and Mita D. Desai, Wavelet Based Automatic Thresholding for Image Segmentation, In Proc. of ICIP'97, Santa Barbara, Calif., Oct. 26-29, 1997; Sue Wu and Adnan Amin, Automatic Thresholding of Gray-level Using Multi-stage Approach, proceedings of the Seventh International Conference on Document Analysis and Recognition (ICDAR 2003); Michael H. F. Wilkinson, Tsjipke Wijbenga, Gijs de Vries, and Michel A. Westenberg, BLOOD VESSEL SEGMENTATION USING MOVING-WINDOWROBUST AUTOMATIC THRESHOLD SELECTION, IEEE International Conference on Image Processing, September 2003.). For images with multiple object types with high object boundary contrast, edge detection methods are often used for object segmentation. (Yitzhak Yitzhaky and Eli Peli, A Method for Objective Edge Detection Evaluation and Detector Parameter Selection, IEEE TRANSACTIONS ON PATTERN ANALYSIS AND MACHINE INTELLIGENCE, VOL. 25, NO. 8, PP. 1027-1033, August 2003.

Application specific object segmentation methods were developed for complicated yet well-defined and high volume applications such as blood cell counting, Pap smear screening, and semiconductor inspection. Human with image processing expertise through extensive programming and trial and error process that involves not only object segmentation module but also optics, illumination, and image acquisition process adjustments developed the application specific object segmentation methods. For complicated yet not well-defined or low volume applications, automatic segmentation method doe not exist. In these applications, object segmentation is often performed by human manually or uses a combination of human and computer interaction.

As an example, prior art cell and tissue segmentation methods are based on simple thresholding followed by rudimentary measurements (Cellomics/ArrayScan, Molecular Devices/Discovery 1, Amersham/IN CELL Analyzer 3000, Atto Biosciences/Pathway HT, Q3DM/EIDAQ 100-HTM). The cell and tissue segmentation results are therefore highly dependent on the ability of the specimen preparation and staining process to create simple, well defined objects of interest that have minimum overlaps. In this case, the cells can be easily segmented by thresholding on simple color or intensity values. They are therefore limited to standard assays and are non-robust and inflexible for changes. This is the state-of-art and the foundation of the current computer cell analysis system.

Cell and tissue high content/context screening assays have the potential to take pivotal role in the drug discovery process in the post-genomic era. High content/context screening assays provide large amounts of biological and chemical information that could help researchers discover the most effective drugs more efficiently, while getting flawed compounds to "fail fast," thus saving considerable time and expense. Live cell high context screening assays can be used across nearly all stages of the drug discovery and development process, including target identification and validation, lead selection and optimization, and preclinical studies. However, in the live cell assay, in order to maintain the cell nature environment for meaningful studies there is limited control over the staining quality and cell configuration arrangement. The cells could be highly overlapped and live in aggregates. This represents a formidable challenge for fully automatic cell segmentation.

More sophisticated object segmentation methods are disclosed in Brette L. Luck1, Alan C. Bovik1, Rebecca R. Richards-Kortum, SEGMENTING CERVICAL EPITHELIAL NUCLEI FROM CONFOCAL IMAGES USING GAUSSIAN MARKOV RANDOM FIELDS, IEEE International Conference on Image Processing, September 2003", "Lee, Shih-Jong, U.S. Pat. No. 5,867,610, Method for identifying objects using data processing techniques" and "Lee, Shih-Jong, Oh, Seho, US patent application publication no.

20040202368, Learnable Object Segmentation", which is incorporated in its entirety herein. However, these more sophisticated object segmentation methods and the thresholding based methods are mostly region based that applies a threshold on some image characteristics. The threshold could be a global one that is either fixed or dynamically determined from the histogram of the image characteristics. The threshold could also be a local one where the values are different for different pixel locations. The underlying assumption of the thresholding approach is that the regions of object should be uniform and homogeneous with respect to the image characteristics of interest. This approach could sufficiently detects significant portions of the object regions. However, the resulting object regions are often not accurate. This is especially the case for the boundaries of the objects. This is because the object region characteristics of interest often are different when close to the boundary of the objects. Therefore, boundaries of an object may be over-segmented or under-segmented by the initial detection methods.

Alternative methods of object segmentation is boundary based method (C. C. Leung, W. F. Chen2, P. C. K. Kwok, and F. H. Y. Chan, Brain Tumor Boundary Detection in MR Image with Generalized Fuzzy Operator, IEEE International Conference on Image Processing, September 2003.) which could yield accurate object boundary but often have gaps between the edges and cannot completely define an object region, problem in object connectivity. The inaccurate object segmentation yields incorrect measurements on the segmented objects (Pascal Bamford, EMPIRICAL COMPARISON OF CELL SEGMENTATION ALGORITHMS USING AN ANNOTATED DATASET, IEEE International Conference on Image Processing, September 2003). Any analysis and conclusion drawn based on the incorrect measurements will be erroneous and compromised.

A region-guided boundary refinement method (Shih-Jong J. Lee, Tuan Phan, "Region-guided Boundary Refinement Method", U.S. patent application Ser. No. 10/998,282, November 2004) was disclosed to overcome the problem of boundary inaccuracy of the region based segmentation method and the problem of object connectivity in the edge based segmentation method. It uses the initial detection of object regions as the baseline for boundary refinement. This method works only for non-overlapping objects. It fails when the boundary of an object is shared by other objects due to touching or overlapping. Overlapping objects common in many real life applications such as cellular or subcellular object analysis and cell high content screening. This limitation presents a significant disadvantage that hinders quantitative analysis and automation.

OBJECTS AND ADVANTAGES

This invention overcomes the prior art problems in overlapping objects. It receives an initial object region of interest containing one object and an input image. It performs directional edge enhancement followed by radial detection and final shaping on the input image around the object region of interest to generate a boundary refined single object region output. It detects object boundary specifically for the given object region of interest even if the boundary is shared by multiple objects due to touching or overlapping objects. When the process is applied multiple times to multiple overlapped object regions of interest, a single image pixel could be mapped to multiple objects. This allows boundary definitions for overlapped object regions.

The primary objective of the invention is to provide accurate boundary definitions for overlapped object regions. The second objective of the invention is to provide a general purpose method to refine objects from initial object region of interest defined by human. The third objective of the invention is to provide a general purpose method to refine objects from initial object region of interest defined by any initial object segmentation method. A fourth objective of the invention is to provide a fast processing method to object segmentation since simple initial detection may be sufficient and the refinement only have to handle object regions of interest rather than the whole images. A fifth objective of the invention is to provide highly accurate object segmentation masks for biological objects such as live cell phase contrast images. The sixth objective of the invention is to provide accurate object segmentation mask for object feature measurements.

SUMMARY OF THE INVENTION

An object based boundary refinement method for object segmentation in digital images receives an image and a single initial object region of interest and performs refinement zone definition using the initial object regions of interest to generate refinement zones output. A directional edge enhancement is performed using the input image and the refinement zones to generate directional enhanced region of interest output. A radial detection is performed using the input image the refinement zones and the directional enhanced region of interest to generate radial detection mask output. In addition, a final shaping is performed using the radial detection mask having single object region output.

A directional edge enhancement method determining pixel specific edge contrast enhancement direction according to the object structure direction near the pixel consists receives an image and refinement zones and performs 1D horizontal distance transform and 1D vertical distance transform using the refinement zones to generate horizontal distance map and vertical distance map outputs. A neighboring direction determination is performed using the horizontal distance map and the vertical distance map to generate neighboring image output. In addition, a directional edge contrast calculation using the neighboring image and input image having directional enhanced region of interest output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which:

FIG. 6 shows an example for horizontal distance transform;

DETAILED DESCRIPTION OF THE INVENTION

I. Application Scenario

Figure 1:
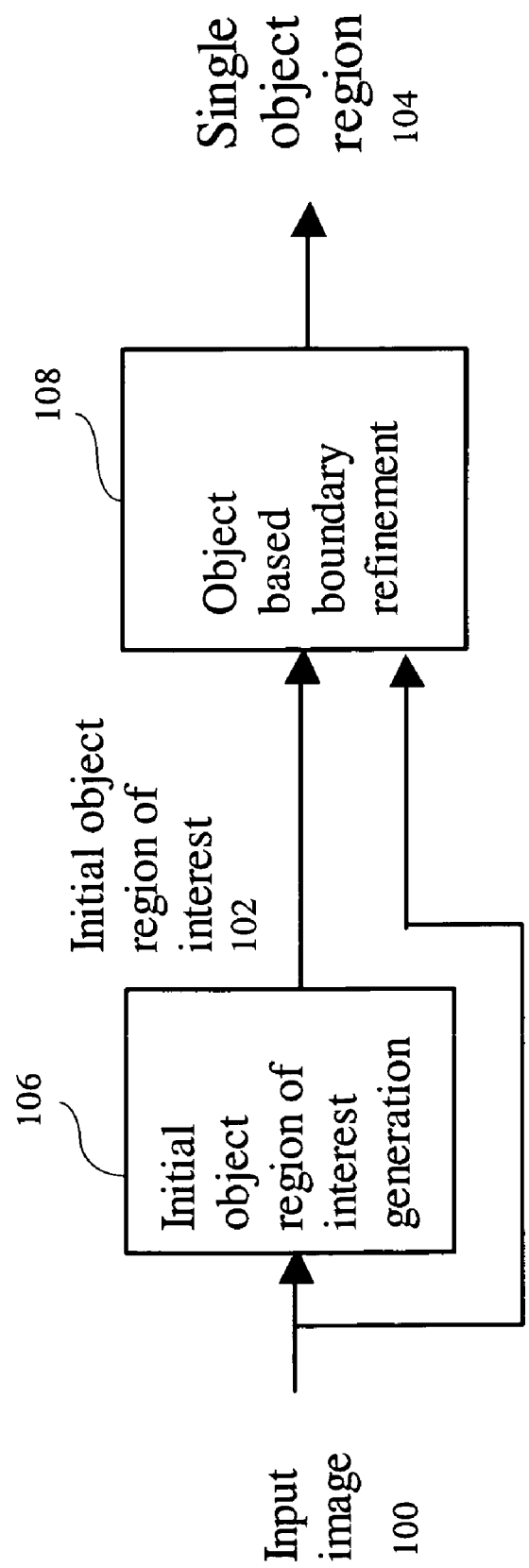
FIG. 1 shows the processing flow for the object based boundary refinement application scenario.

The processing flow for the application scenario of the object based boundary refinement method is shown in FIG. 1. It includes two steps. The first step, initial object region of interest generation 106, generates a single initial object region of interest 102 from the input image 100. The second step, object based boundary refinement 108, performs one object of interest boundary refinement within the single initial object region of interest 102. This results in single object region 104 output.

As shown in FIG. 1, the input image 100 is processed by the initial object region of interest generation 106 step for single initial object region of interest 102 generation. The single initial object region of interest 102 could be generated automatically using methods such as initial detection followed by region partition (Shih-Jong J. Lee, Tuan Phan, "Method for Adaptive Image Region Partition and Morphologic Processing", U.S. patent application Ser. No. 10/767,530, January 2004). Alternatively, the initial object region of interest 102 could be created manually using computer graphical tool.

Figure 2:
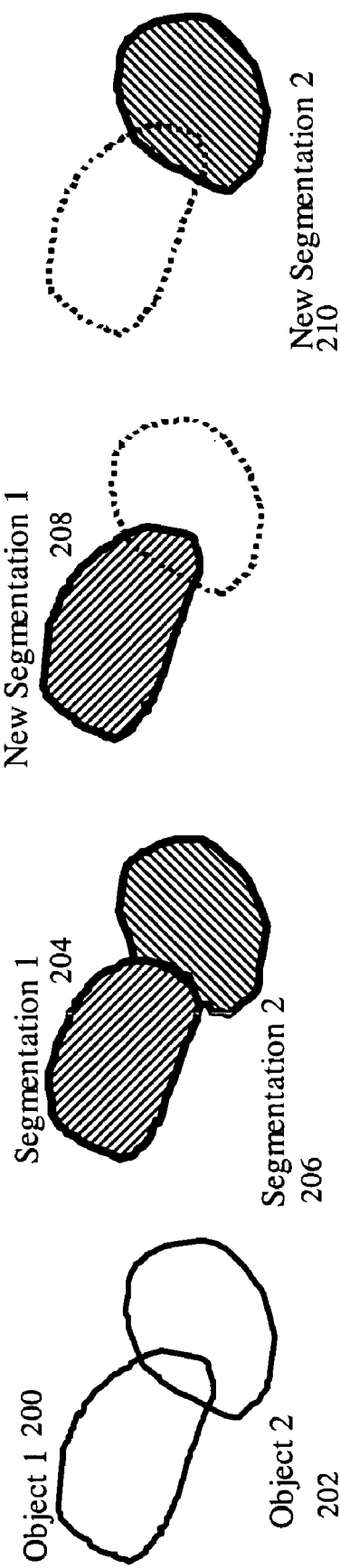
FIG. 2A illustrates outlines of two overlapped objects, Object 1 and Object 2.
FIG. 2B illustrates segmentation results, Segmentation 1 and Segmentation 2, falsely divide the overlap region into one of the segmentation masks.
FIG. 2C illustrates multiple object mapping supported segmentation mask for Object 1, New Segmentation 1.
FIG. 2D illustrates multiple object mapping supported segmentation mask for Object 2, New Segmentation 2.

A key advantage of the object based boundary refinement method is its ability to detect object boundary specifically for the given object region of interest even if the boundary is shared by multiple objects due to touching or overlapping objects. When the process is applied multiple times to multiple overlapped object regions of interest, a single image pixel could be mapped to multiple objects. This allows boundary definitions for overlapped object regions. Overlapped boundary definition is illustrated in FIGS. 2A-D. FIG. 2A illustrates the outlines of two overlapped objects, Object 1 (200) and Object 2 (202). FIG. 2B shows the segmentation results when multiple object mapping is not supported. As shown in FIG. 2B, the segmentation results, Segmentation 1 (204) and Segmentation 2 (206), falsely divide the overlap region so the segmentation masks are incomplete representation of the objects. FIG. 2C shows the multiple object mapping supported segmentation mask for object 1, New Segmentation 1 (208). FIG. 2D shows the multiple object mapping supported segmentation mask for object 2, New Segmentation 2 (210). Note that overlap exists in New Segmentation 1 (208) and New Segmentation 2 (210).

The detailed embodiment of the object based boundary refinement is described in the next sections.

II. Object Based Boundary Refinement Overview

Figure 3:
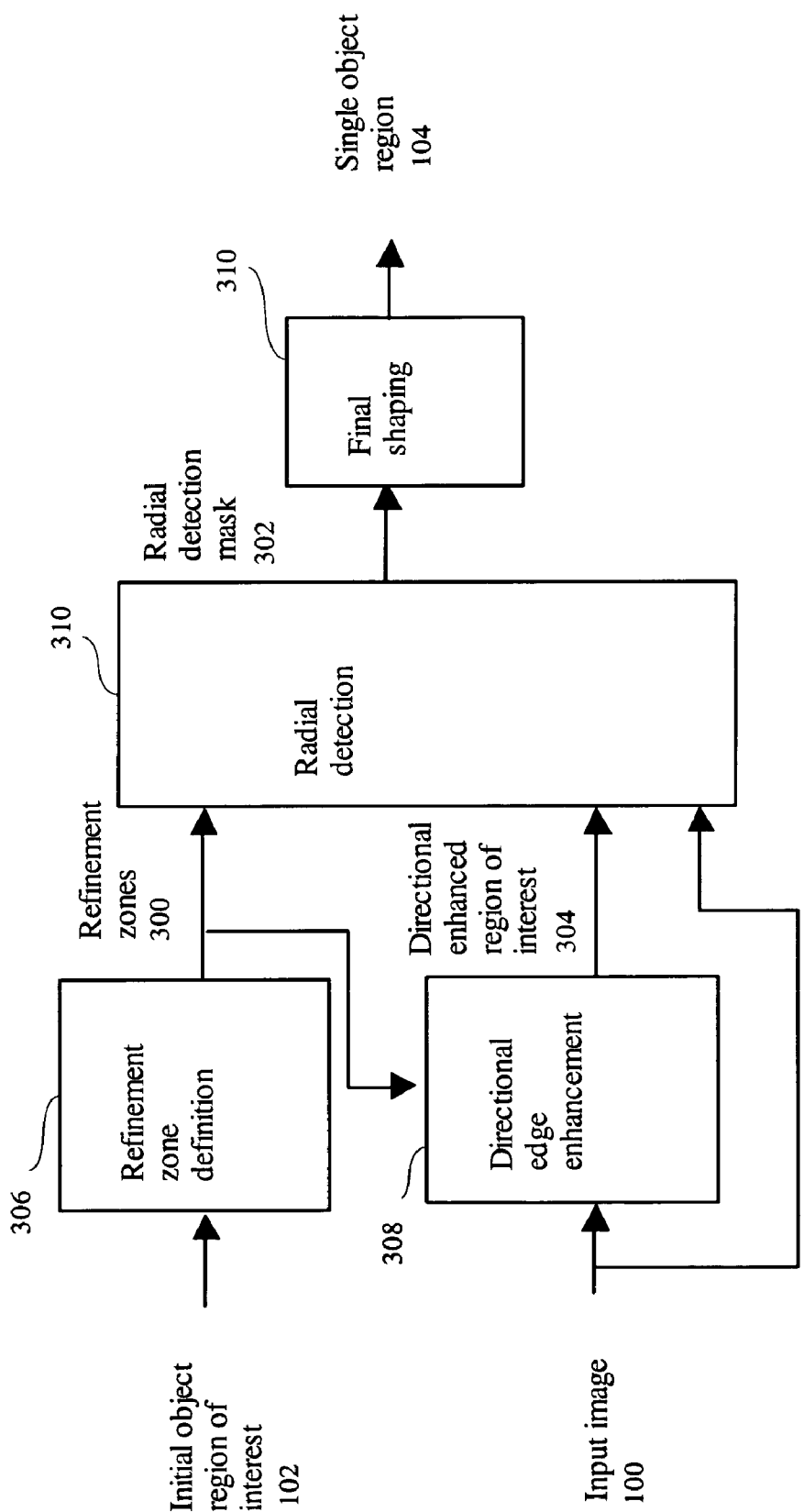
FIG. 3 shows the processing flow for the object based boundary refinement method.

The object based boundary refinement performs directional edge enhancement followed by radial detection on the input image around the refinement zones. The radial detection result is shaped to generate a boundary refined single object region output. The processing steps is shown in FIG. 3. As shown in FIG. 3, the single initial region of interest 102 is processed by the refinement zone definition step 306 to generate refinement zones output 300. The input image 100 is processed by the directional edge enhancement step 308 around the refinement zones 300 to generate directional enhanced region of interest 304. The directional enhanced region of interest 304 and refinement zones 300 are processed by a radial detection step 310 to generate a radial detection mask output 302. The radial detection mask 302 is processed by a final shaping step 310 to generate a single object region output 104.

III. Refinement Zone Definition

Figure 4:
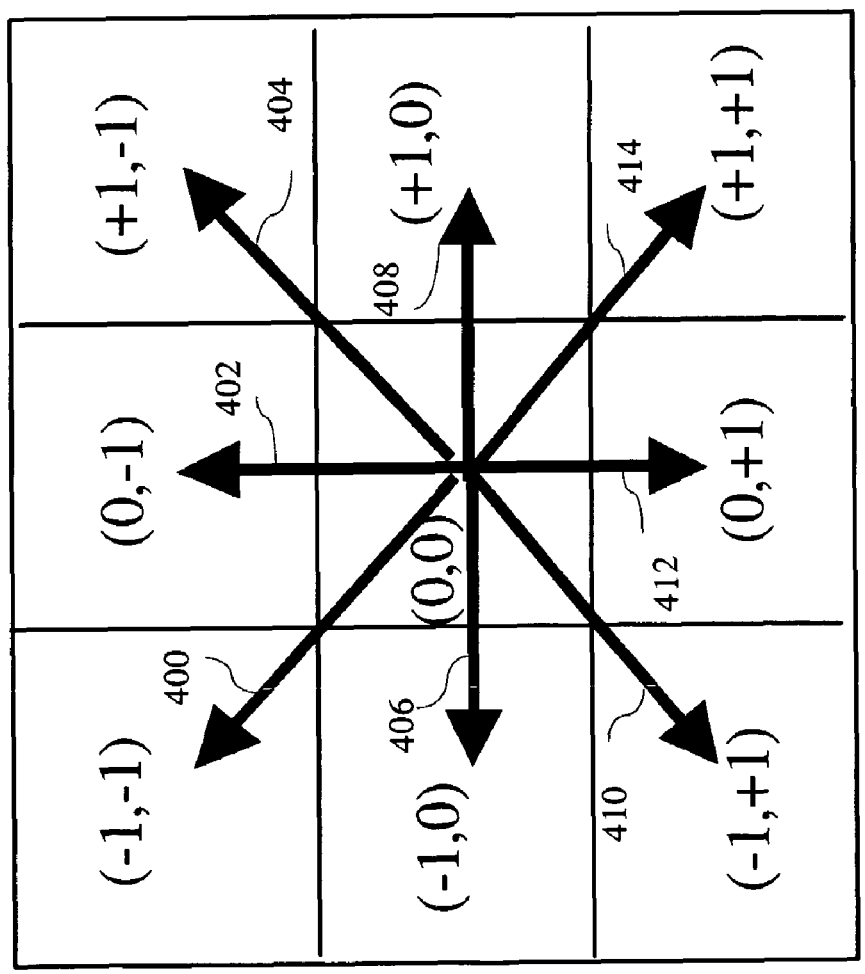
FIG. 4 illustrates different ($\delta x$, $\delta y$) values and their edge directions.

The object based boundary refinement processing supports multiple object mapping. It has to detect the correct object region even if the input image contains overlapped or ambiguous object boundaries. Therefore, the processing has to be constrained around the object region of interest to avoid the false detection of the un-intended object boundaries. To constrain the detection, refinement zones are defined. The refinement zones consist of an outer-limit zone and an inner-limit zone. In one simple embodiment, the outer-limit zone is generated by dilating the initial object region of interest using a structuring element reflecting the plus tolerance of the initial object region of interest specification. Similarly, the inner-limit zone is generated by eroding the initial object region of interest using a structuring element reflecting the minus tolerance of the initial object region of interest. FIG. 4 shows an example cell and its refinement zones.

IV. Directional Edge Enhancement

The prior art edge enhancement uses either isotropic kernel or a fixed directional kernel to extract edge contrast. This is inflexible and could enhance edges as well as noise and variations. Our directional edge enhancement process performs pixel specific directional edge enhancement. The direction for enhancing edge contrast of a pixel is determined individually according to the object structure direction near the pixel. Since the object structure direction is individually determined for each pixel, different directional edge contrasts enhancement could be applied for different pixels. This achieves great advantage (enhance signal and suppress noise) for objects not having fixed structure directions such as biological entities.

In one embodiment, the directional edge contrast for a pixel location (x,y), I_directional (x,y), is calculated by subtracting the pixel's image intensity, I(x,y), and that of one of its adjacent neighboring pixels, I(x+δx,y+δy), as follows:

$$I\_directional\ (x,y) = I(x+\delta x, y+\delta y) - I(x,y)$$

Where $\delta x \in \{-1, 0, +1\}$ and $\delta y \in \{-1, 0, +1\}$

Since there are eight different neighboring pixels depending on the combinations of δx and δy, 8 different directional edge contrasts can be calculated. The δx and δy values and their edge directions are illustrated in FIG. 4. (−1, −1) corresponds to upper left direction 400; (0, −1) corresponds to upper direction 402; (+1, −1) corresponds to upper right direction 404; (−1, 0) corresponds to left direction 406; (+1, 0) corresponds to right direction 408; (−1, +1) corresponds to lower left direction 410; (0, +1) corresponds to lower direction 412; (+1, +1) corresponds to lower right direction 414.

To efficiently determine the object structure direction near a pixel, two one-dimensional distance transforms are performed. The results of the one-dimensional (1D) distance transforms are used to estimate the object structure direction and the δx and δy values for each of the pixels within the processing region. The processing flow of the directional edge enhancement is shown in FIG. 5.

Figure 5:
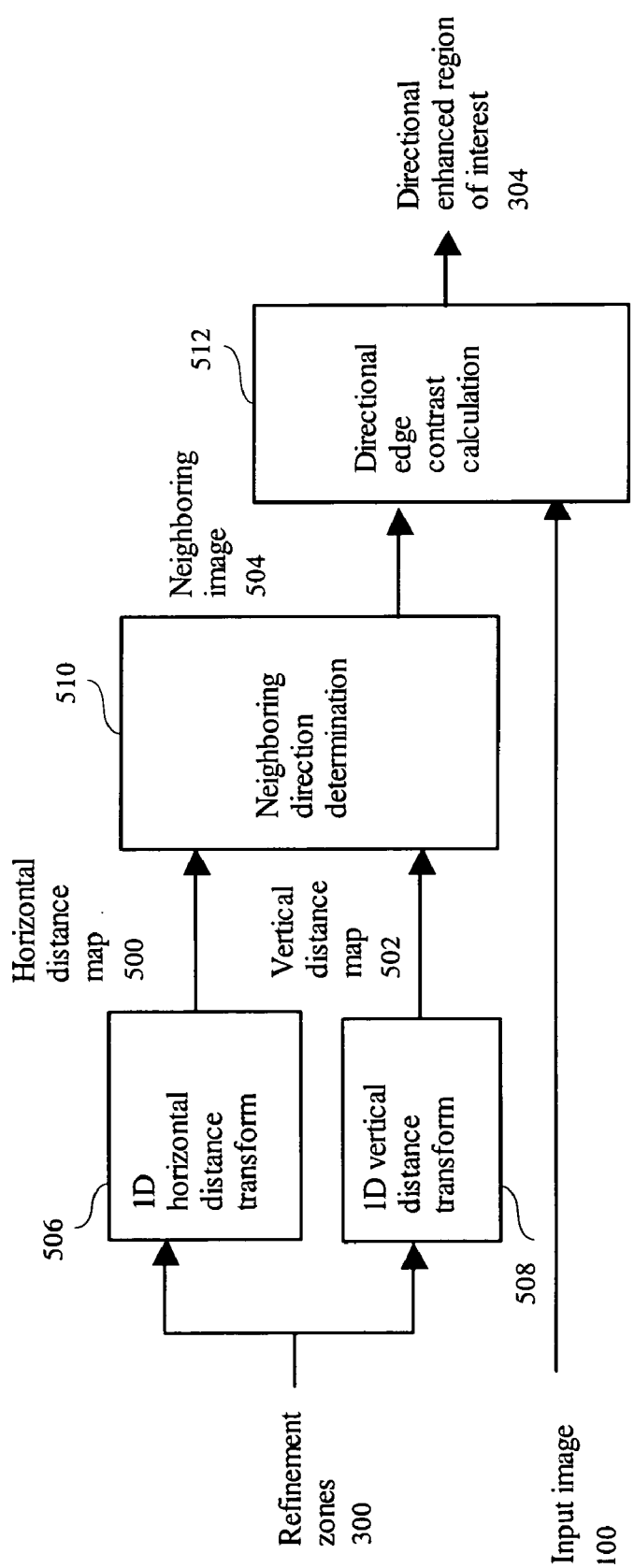
FIG. 5 shows the processing flow for the directional edge enhancement method.

As shown in FIG. 5, the refinement zones 300 are processed by the 1D horizontal distance transform 506 to generate a horizontal distance map 500 and processed by the 1D vertical distance transform 508 to generate a vertical distance map 502. The horizontal distance map 500 and the vertical distance map 502 are processed by a neighboring direction determination step 510 to generate neighboring image 504 containing the δx and δy values for each of the pixels in the processing region. The δx and δy values contained in the neighboring image 504 and the input image 100 are used to perform directional edge contrast calculation 512. This results in the directional enhanced region of interest output 304.

1D Distance Transform

The 1D distance transform determines the shortest distance between an object (foreground) pixel to a non-object (background) pixel. It is performed in either horizontal or vertical direction. An example horizontal distance transform is shown in FIG. 6.

As shown in FIG. 6, the first row lists a 1D horizontal input line containing 9 foreground ("1") pixels 604, 606, 608, 610, 612, 620, 622, 624, 626 and 6 background ("0") pixels 600, 602, 614, 616, 618, 628. The corresponding horizontal distance values are shown in the second row.

The horizontal distance transform can be calculated using a two-pass algorithm. The first (forward) pass scans from left to right. The second (backward) pass scans in a reverse right to left order. In the first pass, the output U(x) at pixel position x is determined as follows:

$$U(x) = \begin{cases} U(x-1) + 1; \forall\, I(x) \in \text{foreground} \\ 0; \forall\, I(x) \in \text{background} \end{cases}$$

The second (backward) pass creates the horizontal distance values D by $$D(x) = \min\{D(x+1)+1, U(x)\}$$

The horizontal distance map, $I_{hd}(x,y)$, is generated by applying the horizontal distance transform to each horizontal line within the processing region which is a slightly enlarged region containing all pixels within the outer-limit zone. The vertical distance transform can be calculated using a similar method and the vertical distance map, $I_{vd}(x,y)$, is generated by applying the vertical distance transform to each vertical line within the processing region.

Neighboring Direction Determination

The neighboring direction determination inputs the horizontal distance map, $I_{hd}(x,y)$, and the vertical distance map, $I_{vd}(x,y)$, and determines δx and δy values for each of the pixels (x,y) in the processing region. This results in the neighboring image. The δx determination method for pixel position (x,y) includes two steps. The first step determines the left-right structure direction as follows:

$$\delta x = \begin{cases} +1; I_{hd}(x,y) > I_{hd}(x+1,y) \\ -1; I_{hd}(x,y) \le I_{hd}(x+1,y) \end{cases}$$

The above first step δx value output is refined by the second step that is applied to determine whether the pixel structure is dominated by the vertical direction (2 times lower distance value). If it is vertically dominated, final δx is set to 0 to neutralize the horizontal direction effect as follows:

$$\delta x = 0;\ \text{If } 2*I_{vd}(x,y) < I_{hd}(x,y)$$

The δy determination method for pixel position (x,y) is similar to that for δx. The first step determines the top-bottom structure direction as follows:

$$\delta y = \begin{cases} +1; I_{vd}(x,y) > I_{vd}(x,y+1) \\ -1; I_{vd}(x,y) \le I_{vd}(x,y+1) \end{cases}$$

The above first step δy value output is refined by the second step that is applied to determine whether the pixel structure is dominated by the horizontal direction (2 times lower distance value). If it is horizontally dominated, final δy is set to 0 to neutralize the vertical direction effect as follows:

$$\delta y = 0;\ \text{If } 2*I_{hd}(x,y) < I_{vd}(x,y)$$

Directional Edge Contrast Calculation

Given the input image and the δx and δy for each pixel, the directional edge contrast for all pixels within the processing region can be calculated by subtracting the pixel's image intensity, I(x,y), and that of its neighboring pixels determined by δx and δy, I(x+δx, y+δy). This results in the directional enhanced region of interest output.

V. Radial Detection

In radial detection, the radial boundary is detected along the radial direction in the polar coordinate transformed image domain. The polar coordinate transformation converts the rectangular coordinate region enclosing the objects of interest into polar coordinate format. The processing flow for the radial detection method is shown in FIG. 7.

Figure 7:
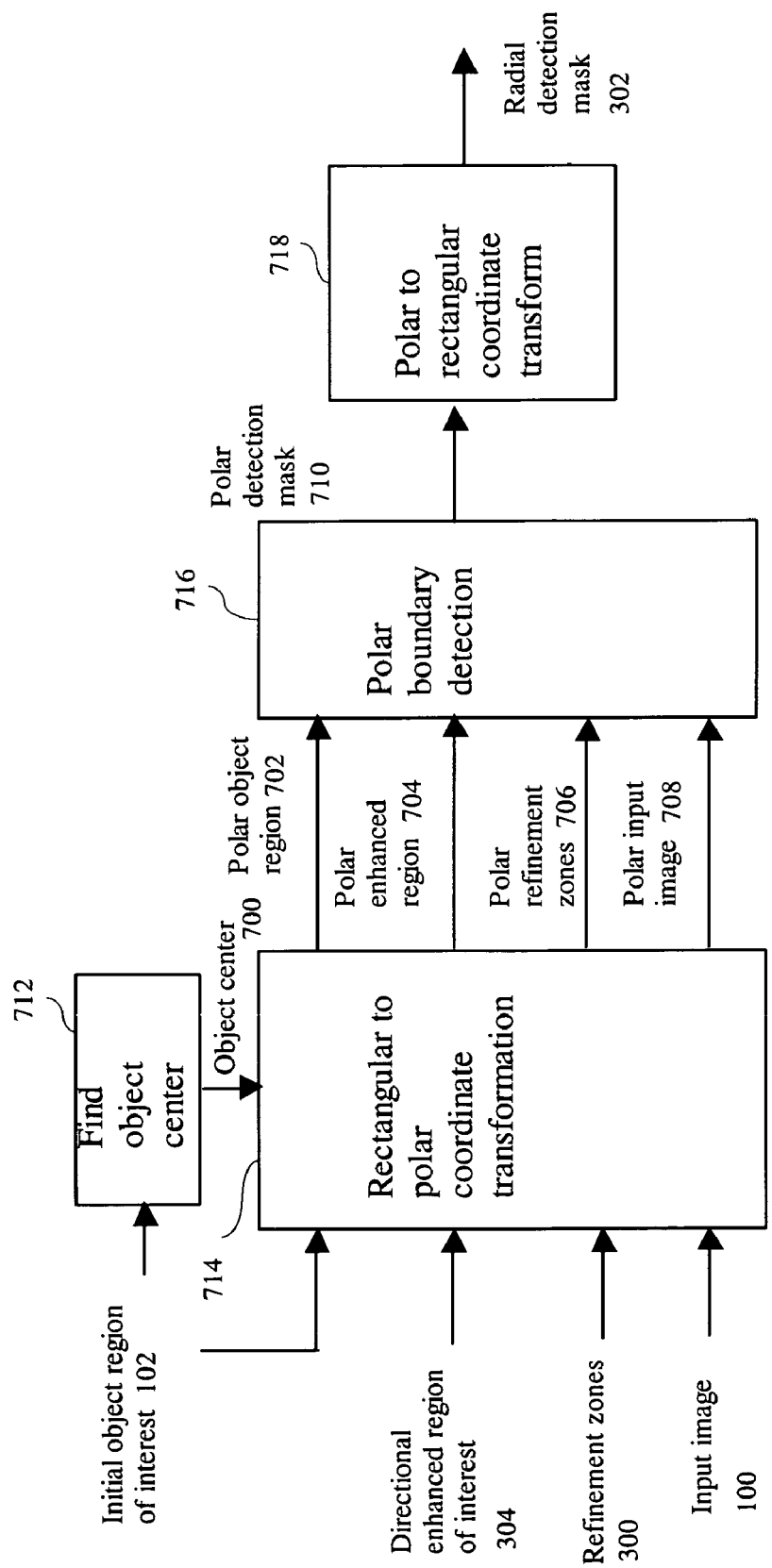
FIG. 7 shows the processing flow for the radial detection method.

As shown in FIG. 7, the initial object region of interest 102 is used to find the object center 700. The object center 700 is used to perform rectangular to polar coordinate transformation 714. The transformation is performed for initial object region of interest 102, directional enhanced region of interest 304, refinement zones 300, and the input image 100. These result in polar object region 702, polar enhanced region 704, polar refinement zones 706, and polar input image 708 outputs. The polar regions 702, 704, 706, 708 are processed by the polar boundary detection step 716 to generate the polar detection mask 710. The polar detection mask 710 is processed by a polar to rectangular coordinate transform 718 to generate the radial detection mask 302.

Find Object Center

The object center is the center point for the polar coordinate transformation. It has to be within the object region. A good center point yields uniform object boundary to angle ratio at different angular ranges. In the embodiment, a distance transform is applied to the initial object region of interest and the centers of the regions having the maximum distance value are object center candidates. When multiple candidates exist, the one that is closet to the centroid of the initial object region of interest is selected as the object center.

Rectangular to Polar Coordinate Transformation

In a general purpose embodiment, the horizontal direction (x-axis) is chosen as the starting direction. The rectangular to polar coordinate transformation steps are listed as follows:
1. Given the rcenter point (x_c, y_c)
2. Select the radius r of the circular region
3. Select a radial sampling factor R
4. Select a angular sampling factor A
5. Determine the width of the transformed region as w=2π/A
6. Determine the length of the transformed region as L=r/R
7. Determine the value of each point of the transformed region by the sequence specified in the following pseudo code:

```
For (i = 0; i < w; i++)
{
    line_direction = i*A;
    For (j = 0; j < L; j++)
    {
        radius = j*R;
        Determine the pixel P that is closest to the point that is at a
        radius distance from (x_c, y_c) along line_direction;
        Set the converted region value at index i and j as: PC[i][j]
            = pixel value
of P;
    }
}
```

For radial detection, the initial object region of interest and the refinement zone (including the outer-limit zone and an inner-limit zone) are binary masks with well-defined boundary. To speed up the transformation, only the boundary points have to be transformed by the procedure described in the above pseudo code. The other points can be filled in automatically in the polar coordinate domain. The directional enhanced region of interest is a grayscale image. So all points in the region have to be separately transformed.

Polar Boundary Detection

The polar boundary detection is performed iteratively. In each iteration, the boundary points are determined for all angles, one radial location (row position) per angle (column in the polar coordinate representation). The boundary points are determined using a dynamic cost function. The proceeding flow chart for the polar boundary detection is shown in FIG. 8.

Figure 8:
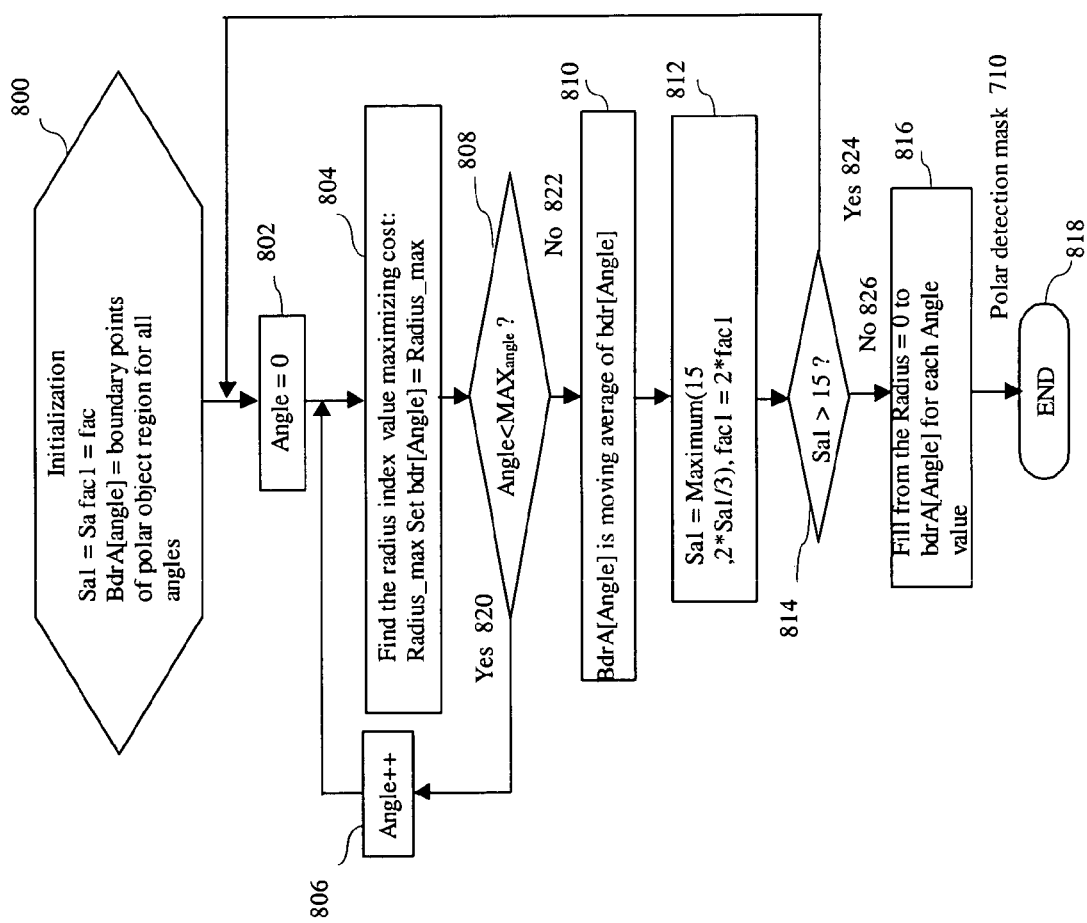
FIG. 8 shows the processing flow chart for the polar boundary detection method.

As shown in FIG. 8, the initialization block 800 initializes the variables Sa1 and fac1. In addition, the accumulated boundary position array BdrA[angle] is initialized using the boundary points of polar object region for all angles. The processing steps between "Angle=0" block (802) and "Angle<$MAX_{angle}$?" block (808) constitute one iteration of boundary detection for all angles.

At each angle 820, 806, the radius index value (radial location) is determined by maximizing a cost function 804. The cost function is determined dynamically by a combination of the polar enhanced region value, the radial edge contrast and a smooth factor that is dynamically updated in each iteration as follows:

$$Cost=Maximum(P_{inp}(Radius+1,Angle)-P_{inp}(Radius, Angle), P_{enhanced}(Radius, Angle)*(1-fac1*abs(Radius-bdrA[Angle]))$$

Where $P_{inp}$(Radius, Angle) is the polar transformed input image and $P_{enhanced}$(Radius, Angle) is the polar enhanced region at the location (Radius, Angle).

After each iteration 822, the detected boundary points are smoothed by performing moving average of the accumulated boundary position array BdrA[angle] 810. The next block (812) updates the Sa1 and fac1 for the next iteration. Sa1 (average size variable) determines the number of iterations to be performed. In one embodiment, the initial value Sa is a function of image magnification as follows:

$$Sa=2*(20/ff1)+1$$

where ff1=40/magnification fac1 is a smooth factor variable that doubles at each iteration. In one embodiment of the invention, its initial value is fac=0.002;

If "Sa1>15" (814, 824), the process increments to the next iteration. Otherwise (826), the process is completed by filling each angle mask from Radius=0 to bdrA[Angle], 816. This results in the polar detection mask 710 and the process is completed 818.

Polar to Rectangular Coordinate Transform

The polar to rectangular coordinate transform is a reverse process to the rectangular to polar coordinate transformation. The polar detection mask is processed by the polar to rectangular coordinate transform step to generate the radial detection mask in the rectangular coordinate domain.

VI. Final Shaping

The final shaping step inputs the radial detection mask and output the final single object region. It constrains the radial detection mask boundary and combines with finer boundary detection from directional enhanced region of interest and the inner-limit zone. Finally, the result is morphologically refined. The processing flow of the final shaping is shown in FIG. 9.

Figure 9:
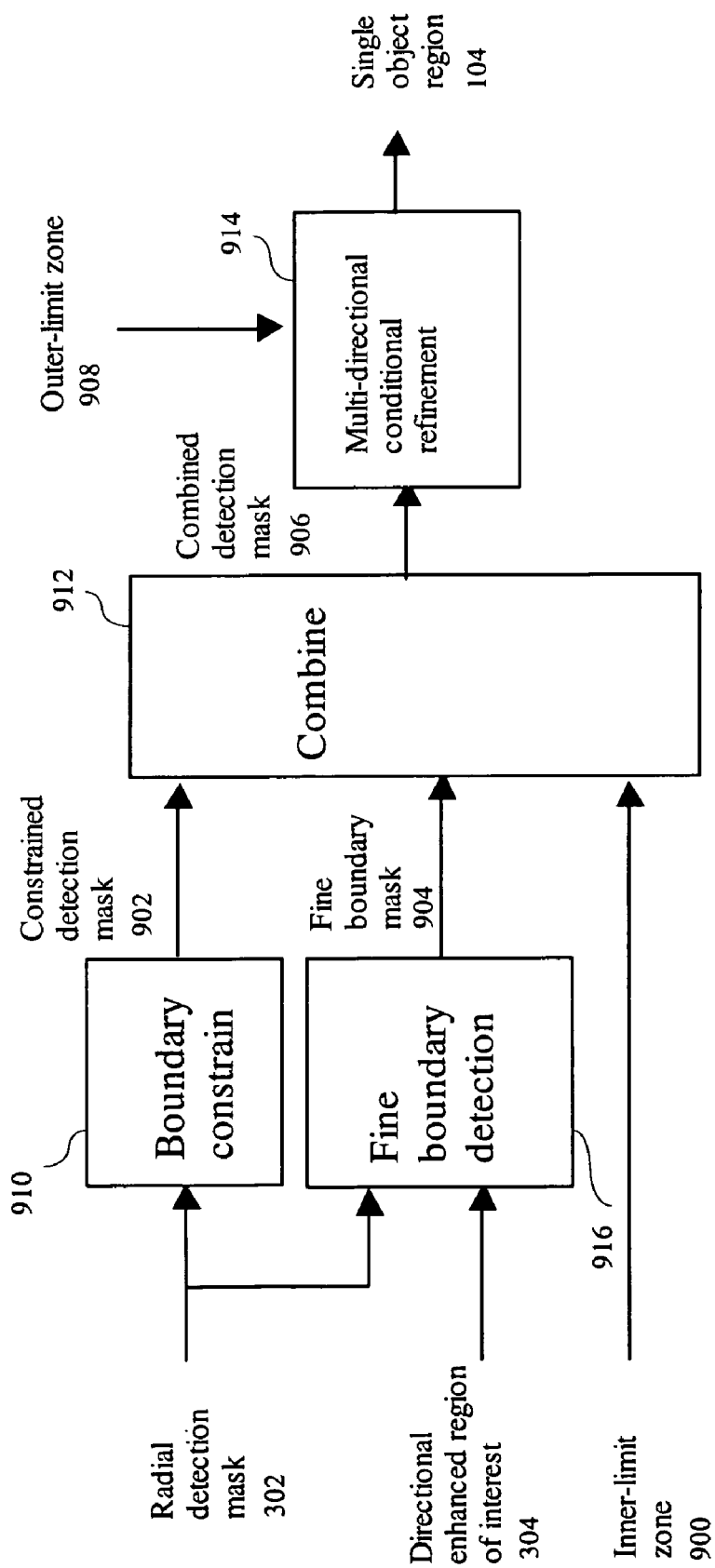
FIG. 9 shows the processing flow for the final shaping method.

As shown in FIG. 9, the radial detection mask 302 is processed by a boundary constrain step 910 to constrain its boundary. This results in a constrained detection mask 902. In one embodiment, the boundary constrain 910 is performed by a simple morphological erosion. The radial detection mask 302 and the directional enhanced region of interest 304 are processed for fine boundary detection 916 to generate fine boundary mask 904.

The constrained detection mask 902, the fine boundary mask 904, and the inner-limit zone 900 are combined by an "OR" (Union) operation 912 to generate a combined detection mask. The combined detection mask 906 is processed by a multi-directional conditional refinement step 914 that erodes the outer-limit zone 908 at multiple directions conditioned by the combined detection mask 906 to generate the single object region output 104.

To perform fine boundary detection 916, the inner edge of the radial detection mask 302 is detected using a erosion residue edge detection. The fine boundary detection 916 performs a threshold on the directional enhanced region of interest 304. The threshold value is determined by a top percentile value of directional enhanced region of interest 304 within the inner edge of the radial detection mask 302.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. An object based boundary refinement method for object segmentation in digital images comprising the steps of:
   a) Inputting an image;
   b) Inputting a single initial object regions of interest;
   Using a computer to perform the steps of
   c) Performing refinement zone definition using the initial object regions of interest to generate refinement zones output, wherein the refinement zones output consists of an outer-limit zone and an inner-limit zone;
   d) Performing directional edge enhancement using the input image and the refinement zones to generate directional enhanced region of interest output;
   e) Performing radial detection using the input image, the refinement zones and the directional enhanced region of interest to generate radial detection mask output;

f) Performing final shaping using the radial detection mask to generate single object region output wherein the final shaping step further consists of the steps of:
   1) Performing boundary constrain using the radial detection mask to generate-constrained detection mask output;
   2) Performing fine boundary detection using the radial detection mask and the directional enhanced region of interest to generate fine boundary mask output;
   3) Combining the constrained detection mask the fine boundary mask and inner-limit zone to generate combined detection mask output;
   4) Performing multi-directional conditional refinement using the combined detection mask and the outer-limit zone to generate single object region output.

2. A directional edge enhancement method determining pixel specific edge contrast enhancement direction according to the object structure direction near the pixel consisting of the steps:
   a) Inputting refinement zones;
   b) Inputting an image;
Using a computer to perform the steps of
   c) Performing 1D horizontal distance transform using the refinement zones to generate horizontal distance map output;
   d) Performing 1D vertical distance transform using the refinement zones to generate vertical distance map output;
   e) Performing neighboring direction determination using the horizontal distance map and the vertical distance map to generate neighboring image output wherein the step of neighboring direction determination contains a $\delta x$ determination method wherein $\delta x \in \{-1, 0, +1\}$ comprising the steps of:
      1) Determining a left-right structure direction using a horizontal distance map to generate a first step $\delta x$ value output;
      2) Determining whether a pixel structure is dominated by vertical direction to generate a final $\delta x$ value output.
   f) Performing directional edge contrast calculation using the neighboring image and input image to generate directional enhanced region of interest output.

3. A directional edge enhancement method determining pixel specific edge contrast enhancement direction according to the object structure direction near the pixel consisting of the steps:
   a) Inputting refinement zones;
   b) Inputting an image;
Using a computer to perform the steps of
   c) Performing 1D horizontal distance transform using the refinement zones to generate horizontal distance map output;
   d) Performing 1D vertical distance transform using the refinement zones to generate vertical distance map output;
   e) Performing neighboring direction determination using the horizontal distance map and the vertical distance map to generate neighboring image output wherein the step of neighboring direction determination contains a $\delta y$ determination method wherein $\delta y \in \{-1, 0, +1\}$ comprising the steps of:
      1) Determining a top-bottom structure direction using a horizontal distance map to generate a first step $\delta y$ value output;
      2) Determining whether a pixel structure is dominated by horizontal direction to generate a final $\delta y$ value output.
   f) Performing directional edge contrast calculation using the neighboring image and input image to generate directional enhanced region of interest output.

4. A directional edge enhancement method determining pixel specific edge contrast enhancement direction according to the object structure direction near the pixel consisting of the steps:
   a) Inputting refinement zones;
   b) Inputting an image;
Using a computer to perform the steps of
   c) Performing 1D horizontal distance transform using the refinement zones to generate horizontal distance map output;
   d) Performing 1D vertical distance transform using the refinement zones to generate vertical distance map output;
   e) Performing neighboring direction determination using the horizontal distance map and the vertical distance map to generate neighboring image output;
   f) Performing directional edge contrast calculation using the neighboring image and input image to generate directional enhanced region of interest output wherein the step of directional edge contrast calculation consists of a step of performing subtraction of a pixel's intensity located at a pixel location (x,y) from its adjacent neighboring pixels located at pixel locations (x+$\delta x$, y+$\delta y$) wherein $\delta x \in \{-1, 0, +1\}$ and $\delta y \in \{-1, 0, +1\}$.

5. A radial detection method detects boundary along the radial direction in the polar coordinate transformed image domain consisting of the steps of:
   a) Inputting an image;
   b) Inputting an initial object region of interest;
   c) Inputting directional enhanced region of interest;
   d) Inputting refinement zones;
Using a computer to perform the steps of
   e) Finding object center using the initial object region of interest to generate object center output;
   f) Performing rectangular to polar coordinate transformation using the initial object region of interest, the directional enhanced region of interest, the refinement zones and the input image to generate polar object region, polar enhanced region, polar refinement zones, and polar input image output;
   g) Performing polar boundary detection using the polar object region, polar enhanced region, polar refinement zones, and polar input image to generate polar detection mask output wherein the step of polar boundary detection is performed iteratively; In each iteration, the boundary points are determined for all angles, one radial location per angle.

6. The step of polar boundary detection of claim 5 wherein the boundary points are determined using a step of applying dynamic cost function.

7. The step of applying dynamic cost function of claim 6 is determined by a combination of the polar enhanced region value, the radial edge contrast and a smooth factor that is dynamically updated in each iteration.

* * * * *